(12) United States Patent
Valkaitis

(10) Patent No.: US 11,943,365 B2
(45) Date of Patent: Mar. 26, 2024

(54) SECURE CROSS-DEVICE AUTHENTICATION SYSTEM

(71) Applicant: UAB 360 IT, Vilnius (LT)

(72) Inventor: Mindaugas Valkaitis, Vilnius (LT)

(73) Assignee: UAB 360 IT, Vilnius (LT)

( * ) Notice: Subject to any disclaimer, the term of this patent is extended or adjusted under 35 U.S.C. 154(b) by 0 days.

(21) Appl. No.: 17/873,103

(22) Filed: Jul. 25, 2022

(65) Prior Publication Data
US 2024/0031160 A1    Jan. 25, 2024

Related U.S. Application Data

(63) Continuation of application No. 17/871,948, filed on Jul. 24, 2022, now Pat. No. 11,537,700.

(51) Int. Cl.
  *H04L 29/06*   (2006.01)
  *H04L 9/08*    (2006.01)
  *H04L 9/32*    (2006.01)

(52) U.S. Cl.
  CPC .......... *H04L 9/3231* (2013.01); *H04L 9/0825* (2013.01); *H04L 9/3234* (2013.01)

(58) Field of Classification Search
  CPC ................ G06F 21/32; H04L 9/3263; H04L 2209/127
  See application file for complete search history.

(56) References Cited

U.S. PATENT DOCUMENTS

| | | |
|---|---|---|
| 9,355,234 B1 | 5/2016 | Shaashua et al. |
| 2014/0270404 A1 | 9/2014 | Hanna et al. |
| 2015/0046990 A1 | 2/2015 | Oberheide et al. |
| 2017/0339151 A1* | 11/2017 | Van Os .................. G06Q 20/12 |
| 2019/0243956 A1 | 8/2019 | Sheets |
| 2021/0297259 A1* | 9/2021 | Rahn ................... H04L 63/0442 |

* cited by examiner

*Primary Examiner* — Jeffrey C Pwu
*Assistant Examiner* — William A Corum, Jr.
(74) *Attorney, Agent, or Firm* — The Pattani Law Group

(57) ABSTRACT

A method including receiving, by an infrastructure device from a first user device, a request to provide a list of available user devices that are available for authenticating the first user device with a service provider; receiving, by the infrastructure device from the first user device, a selection message indicating a selection of a second user device for authenticating the first user device; transmitting, by the infrastructure device to the second user device based on receiving the selection message, an authentication message indicating that the second user device is to authenticate the first user device; receiving, by the infrastructure device from the second user device, one or more encrypted authentication factors associated with authenticating the first user device; and transmitting, by the infrastructure device to the first user device, the one or more encrypted factors associated with authenticating the first user device with the service provider is disclosed.

20 Claims, 6 Drawing Sheets

US 11,943,365 B2

SECURE CROSS-DEVICE AUTHENTICATION SYSTEM

CROSS REFERENCE

This application is a continuation of U.S. Non-Provisional patent application Ser. No. 17/871,948, filed on Jul. 24, 2022, and titled "Secure Cross-Device Authentication System," the entire contents of which are incorporated herein by reference.

FIELD OF DISCLOSURE

Aspects of the present disclosure generally relate to use of computer hardware and/or software for communications, and in particular to providing a secure cross-device authentication system.

BACKGROUND

Various methods of cryptography (e.g., encrypting and decrypting data) are known. Encryption may be associated with changing the data from being in a transparently readable format to being in an encoded, unreadable format with the help of an encryption algorithm. Decryption may be associated with changing the data from being in the encoded, unreadable format to being in the transparently readable format with the help of a decryption algorithm. Encoded/encrypted data may be decoded/decrypted with a given decryption key. In an example, symmetric cryptography may utilize encryption and decryption algorithms that rely on a single private key for encryption and decryption of data. Symmetric cryptography is considered to be relatively speedy. One example of an encryption and decryption algorithm utilized by symmetric encryption may be an AES encryption cipher. On the other hand, asymmetric cryptography may utilize encryption and decryption algorithms that rely on two separate but mathematically-related keys for encryption and decryption of data. For instance, data encrypted using a public key may be decrypted using a separate but mathematically-related private key. The public key may be publicly available through a directory, while the private key may remain confidential and accessible by only an owner of the private key. Asymmetric encryption may also be referred to as public key cryptography. One example of an encryption and decryption algorithm utilized by asymmetric encryption may be the Rivest-Shamir-Adleman (RSA) protocol.

SUMMARY

In one aspect, the present disclosure contemplates a method including determining, by a first user device, unavailability of a first biometric unit associated with the first user device for verification of first biometric information; selecting, by the first user device based at least in part on determining unavailability of the first biometric unit, a second biometric unit associated with a second user device for verification of second biometric information; receiving, by the first user device from the second user device based at least in part on a first verification of the second biometric information, a first factor associated with authentication of the first user device by a service provider; receiving, by the first user device from the second user device based at least in part on successful authentication of the first factor and on a second verification of the second biometric information, a second factor associated with authentication of the first user device by the service provider; and receiving, by the first user device from the service provider, a service based at least in part on successful authentication of the second factor.

In another aspect, the present disclosure contemplates a device comprising a memory and a processor communicatively coupled to the memory, the processor being configured to: determine unavailability of a first biometric unit associated with the first user device for verification of first biometric information; select, based at least in part on determining unavailability of the first biometric unit, a second biometric unit associated with a second user device for verification of second biometric information; receive, from the second user device based at least in part on a first verification of the second biometric information, a first factor associated with authentication of the first user device by a service provider; receive, from the second user device based at least in part on successful authentication of the first factor and on a second verification of the second biometric information, a second factor associated with authentication of the first user device by the service provider; and receive, from the service provider, a service based at least in part on successful authentication of the second factor.

In another aspect, the present disclosure contemplates a non-transitory computer readable medium storing instructions, which when executed by a processor cause the processor to: determine unavailability of a first biometric unit associated with the first user device for verification of first biometric information; select, based at least in part on determining unavailability of the first biometric unit, a second biometric unit associated with a second user device for verification of second biometric information; receive, from the second user device based at least in part on a first verification of the second biometric information, a first factor associated with authentication of the first user device by a service provider; receive, from the second user device based at least in part on successful authentication of the first factor and on a second verification of the second biometric information, a second factor associated with authentication of the first user device by the service provider; and receive, from the service provider, a service based at least in part on successful authentication of the second factor.

It is to be understood that both the foregoing general description and the following detailed description are exemplary and explanatory in nature and are intended to provide an understanding of the present disclosure without limiting the scope thereof. In that regard, additional aspects, features, and advantages of the present disclosure will be apparent to one skilled in the art from the following detailed description.

BRIEF DESCRIPTION OF THE DRAWINGS

The accompanying drawings illustrate aspects of systems, devices, methods, and/or mediums disclosed herein and together with the description, serve to explain the principles of the present disclosure. Throughout this description, like elements, in whatever aspect described, refer to common elements wherever referred to and referenced by the same reference number. The characteristics, attributes, functions, interrelations ascribed to a particular element in one location apply to those elements when referred to by the same reference number in another location unless specifically stated otherwise.

The figures referenced below are drawn for ease of explanation of the basic teachings of the present disclosure; the extensions of the figures with respect to number, position, relationship, and dimensions of the parts to form the following aspects may be explained or may be within the skill of the art after the following description has been read and understood. Further, exact dimensions and dimensional proportions to conform to specific force, weight, strength, and similar requirements will likewise be within the skill of the art after the following description has been read and understood.

The following is a brief description of each figure used to describe the present disclosure, and thus, is being presented for illustrative purposes only and should not be limitative of the scope of the present disclosure.

Figure 1:
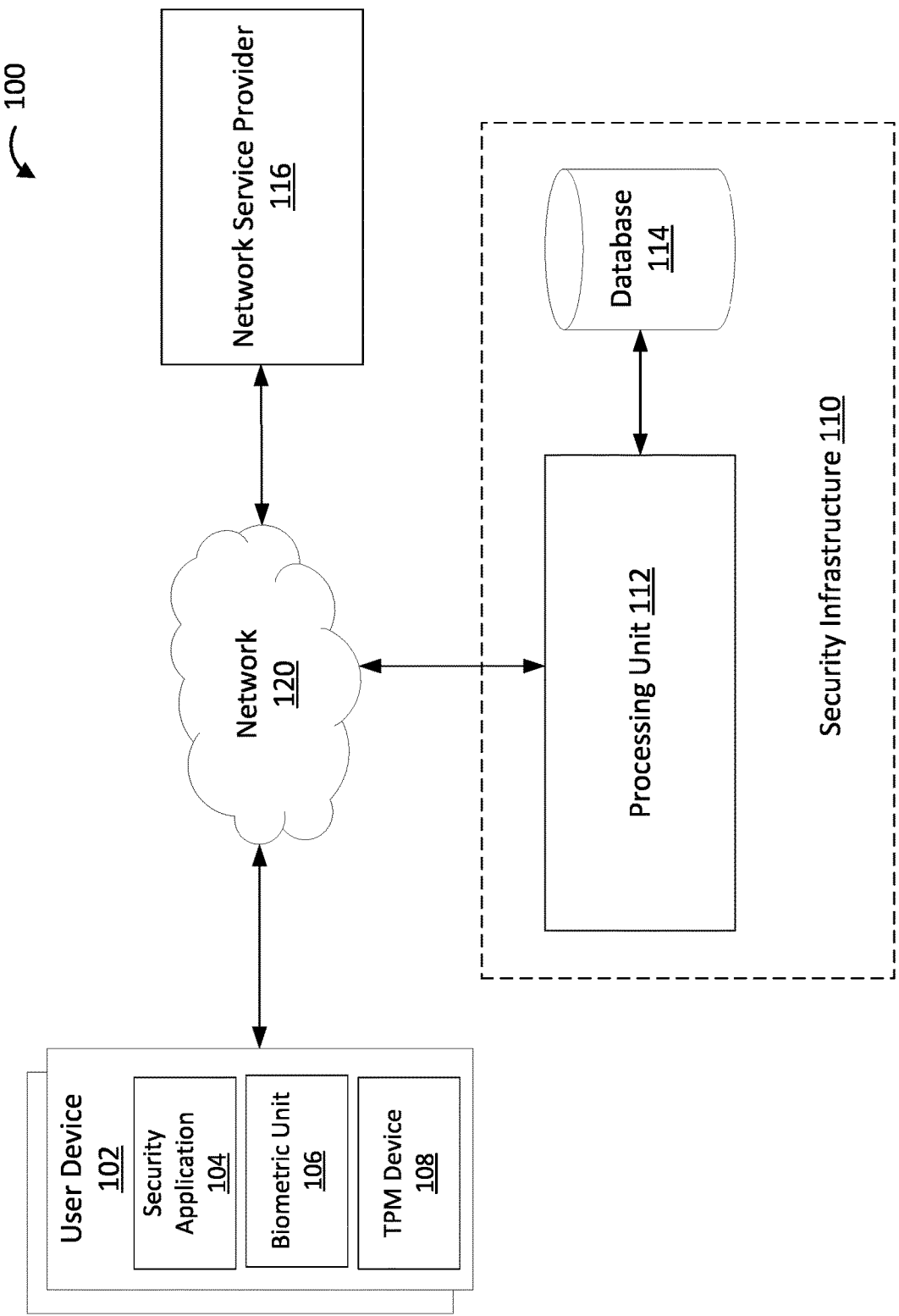

FIG. 1 is an illustration of an example system associated with a secure cross-device authentication system, according to various aspects of the present disclosure.

Figure 2:
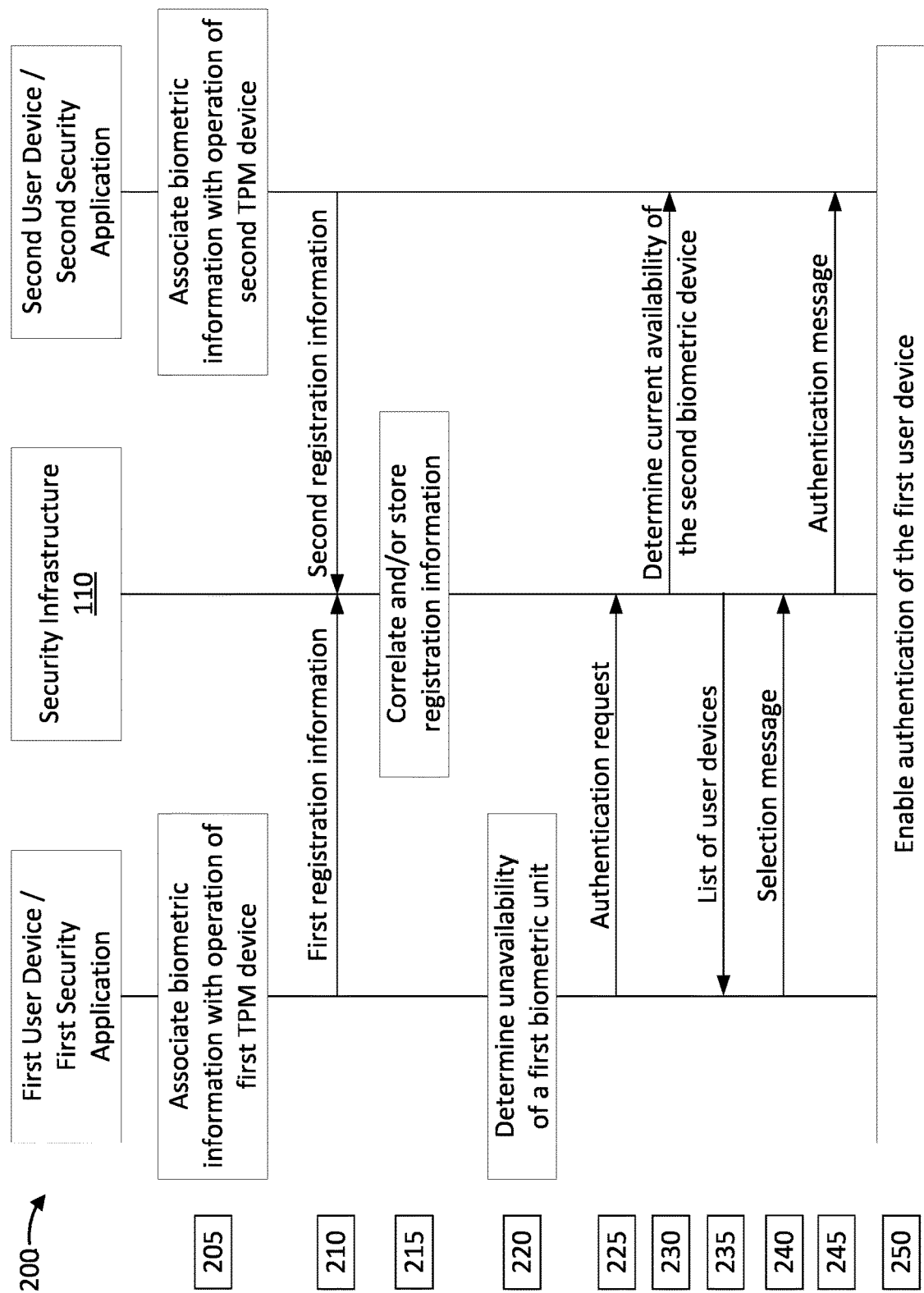

FIG. 2 is an illustration of an example flow associated with a secure cross-device authentication system, according to various aspects of the present disclosure.

Figure 3:
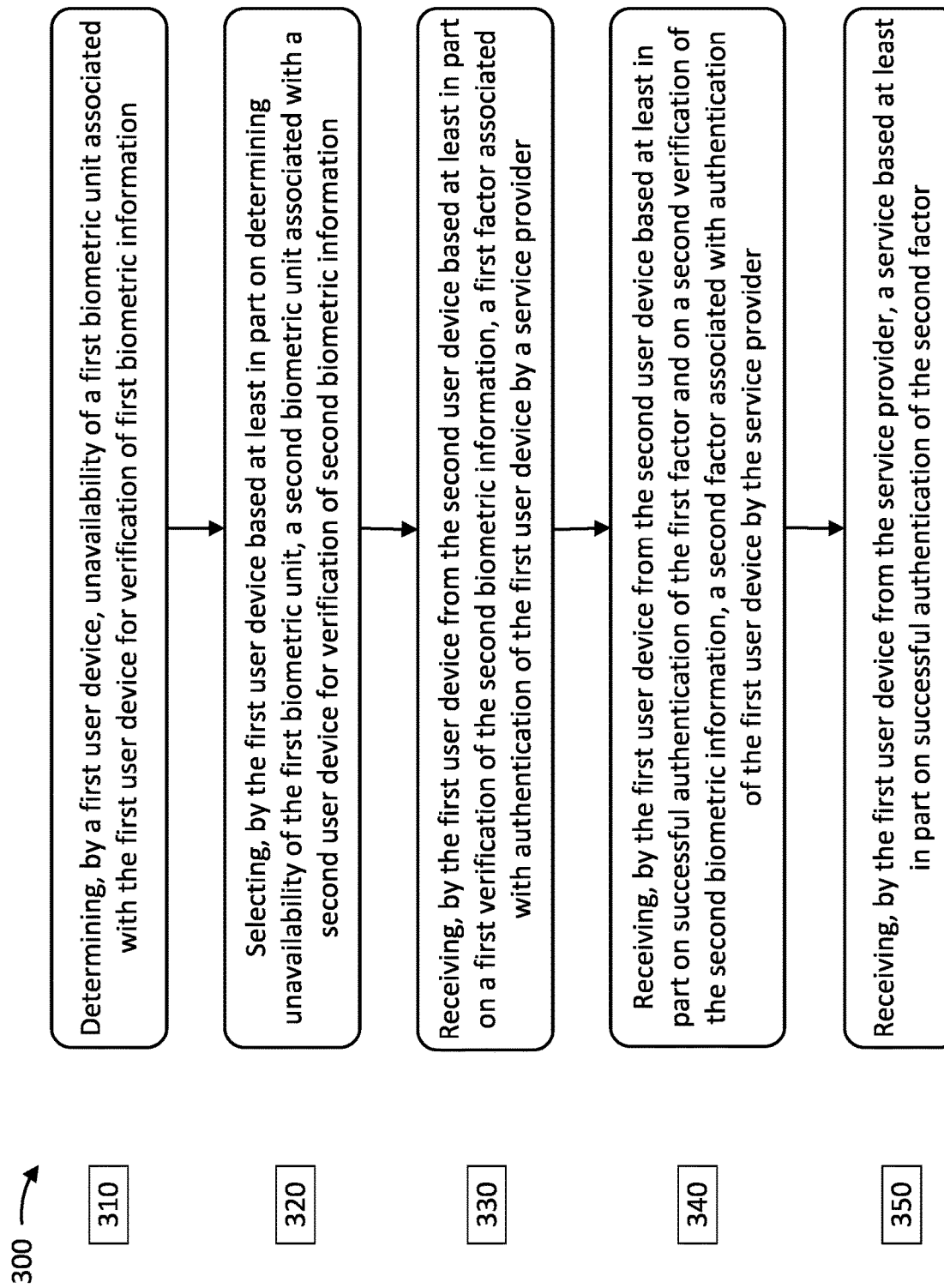

FIG. 3 is an illustration of an example process associated with a secure cross-device authentication system, according to various aspects of the present disclosure.

Figure 4:
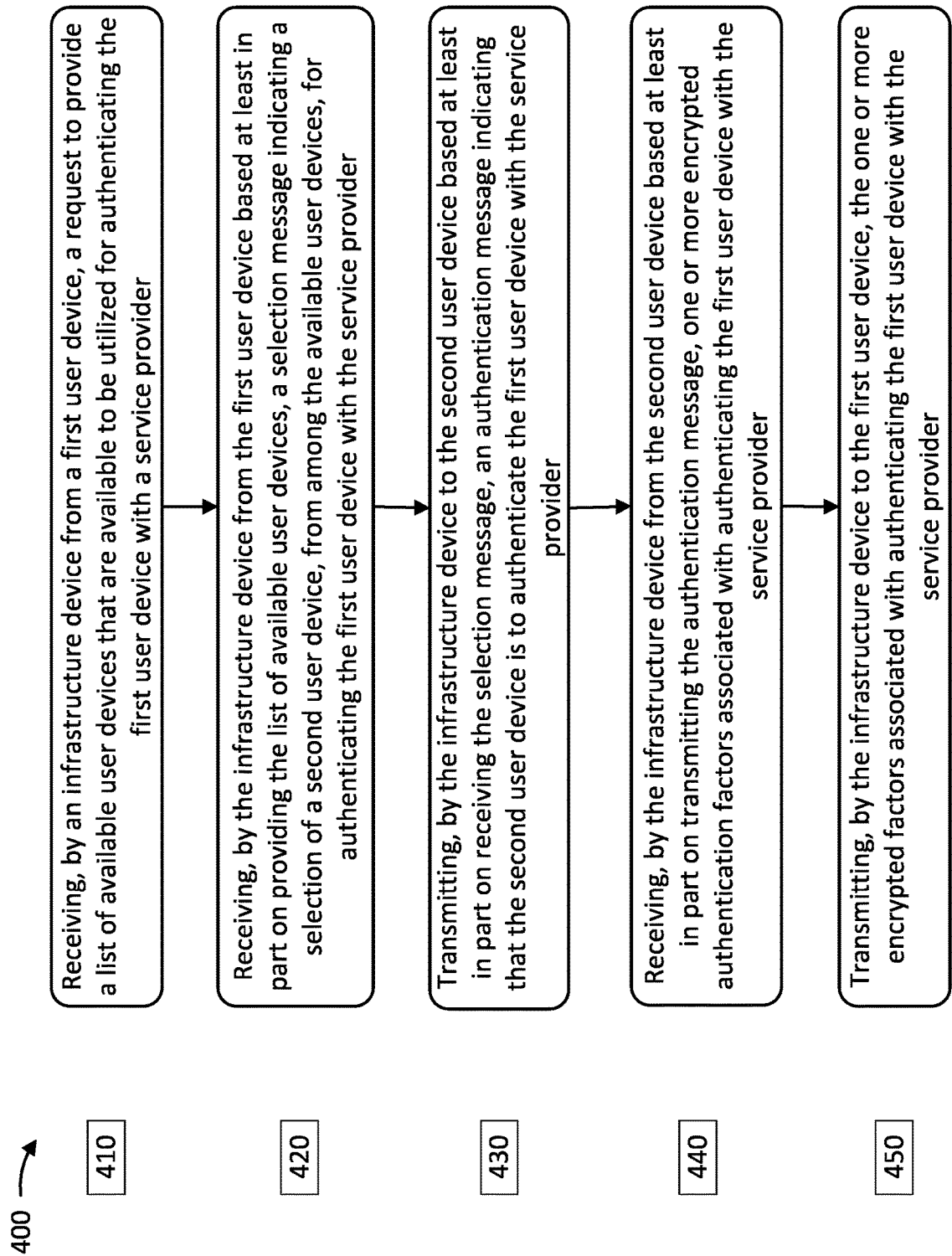

FIG. 4 is an illustration of an example process associated with a secure cross-device authentication system, according to various aspects of the present disclosure.

Figure 5:
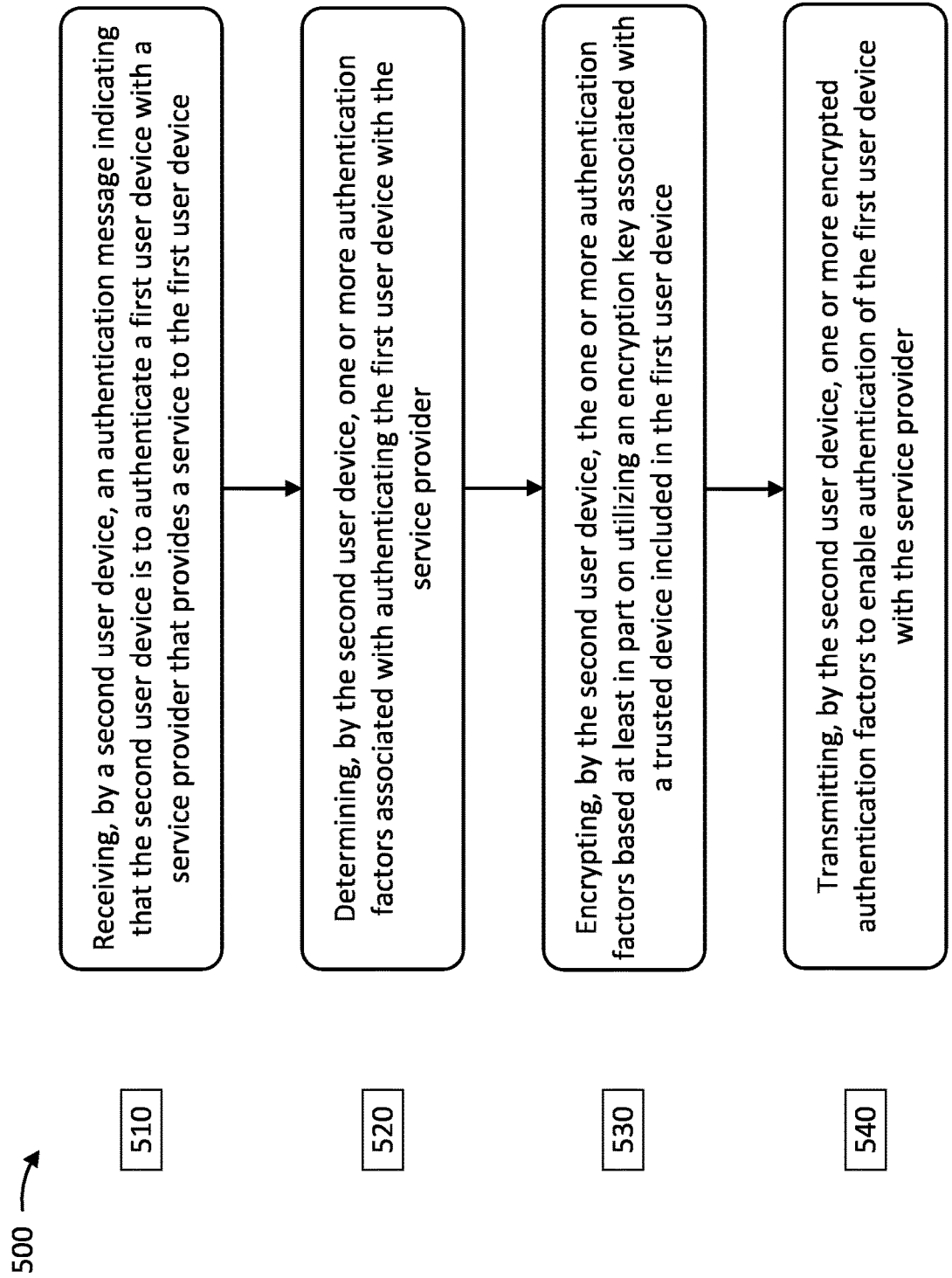

FIG. 5 is an illustration of an example process associated with a secure cross-device authentication system, according to various aspects of the present disclosure.

Figure 6:
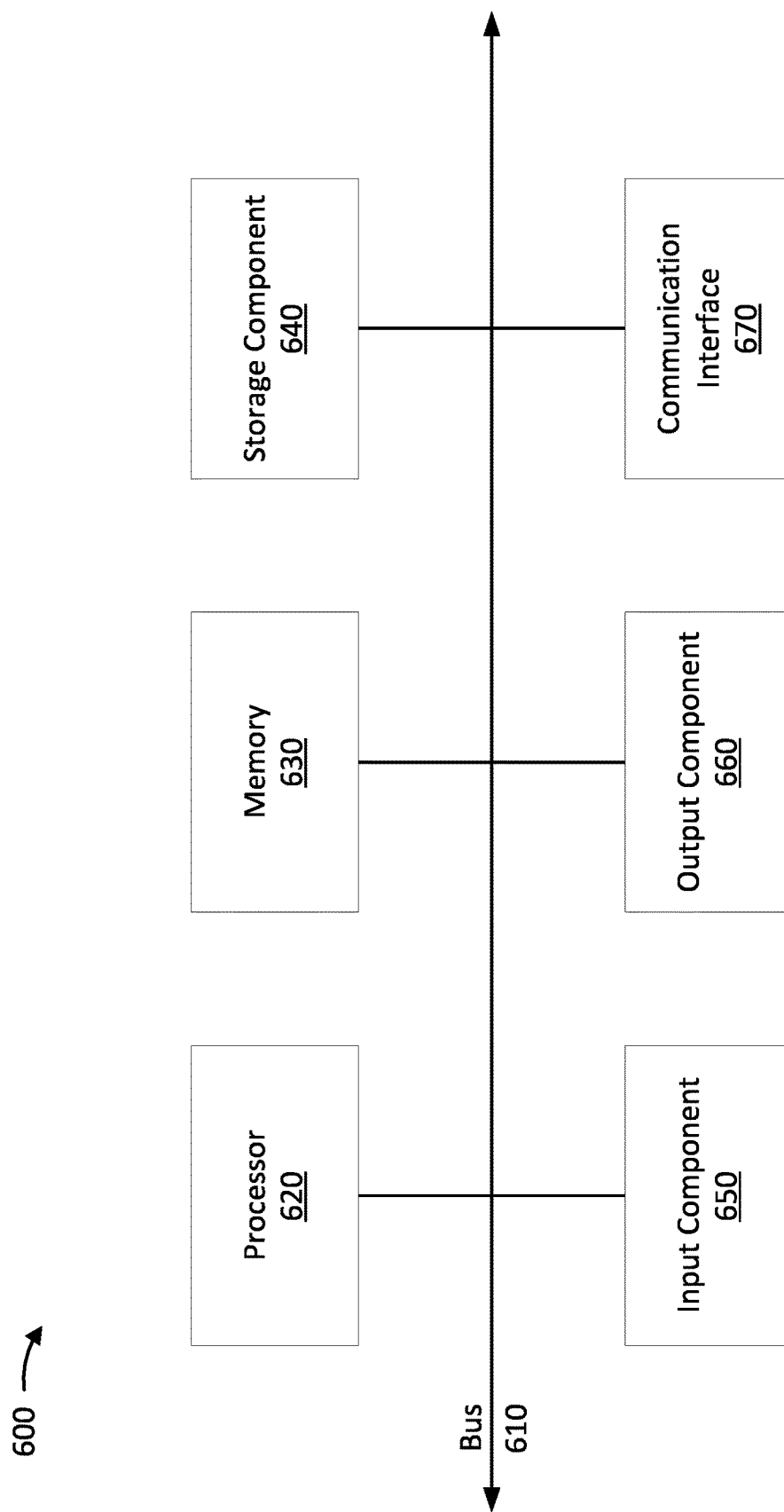

FIG. 6 is an illustration of example devices associated with a secure cross-device authentication system, according to various aspects of the present disclosure.

DETAILED DESCRIPTION

For the purposes of promoting an understanding of the principles of the present disclosure, reference will now be made to the aspects illustrated in the drawings, and specific language may be used to describe the same. It will nevertheless be understood that no limitation of the scope of the disclosure is intended. Any alterations and further modifications to the described devices, instruments, methods, and any further application of the principles of the present disclosure are fully contemplated as would normally occur to one skilled in the art to which the disclosure relates. In particular, it is fully contemplated that the features, components, and/or steps described with respect to one aspect may be combined with the features, components, and/or steps described with respect to other aspects of the present disclosure. For the sake of brevity, however, the numerous iterations of these combinations may not be described separately. For simplicity, in some instances the same reference numbers are used throughout the drawings to refer to the same or like parts.

FIG. 1 is an illustration of an example system 100 associated with a secure cross-device authentication system, according to various aspects of the present disclosure. The system 100 includes one or more user devices 102, a security infrastructure 110, and a network service provider 116 capable of communicating with each other over a network 120. In some aspects, a user device 102 and the network service provider 116 may communicate with one another for purposes of obtaining and/or providing network services. The network services may include any service provided over a network (e.g., Internet) such as, for example, electronic mail services, social media services, messaging services, virtual private network (VPN) services, data storage and protection services, financial services, e-commerce services, or a combination thereof. In some aspects, the user device 102 and the security infrastructure 110 may communicate with one another for purposes of obtaining and/or providing cyber security services. The cyber security services may include, for example, an authentication service during which the security infrastructure 110 enables secure authentication of the user device 102 with the network service provider 116. In some aspects, the security infrastructure 110 and the network service provider 116 may communicate with each other for purposes of authenticating the user device 102 with the network service provider 116.

A user device 102, from among the one or more user devices 102, may include and/or be associated with a security application 104, a biometric unit 106, and a trusted platform module (TPM) device 108 communicatively coupled to an associated processor (e.g., processor 620) and/or memory (e.g., memory 630). In some aspects, the associated processor and/or memory may be local to the user device 102. In some aspects, the associated processor and/or memory may be located remotely with respect to the user device 102.

The user device 102 may be a physical computing device capable of hosting the security application 104 and of connecting to the network 120. The user device 102 may be, for example, a laptop, a mobile phone, a tablet computer, a desktop computer, a smart device, a router, or the like. In some aspects, the user device 102 may include, for example, Internet-of-Things (IoT) devices such as VSP smart home appliances, smart home security systems, autonomous vehicles, smart health monitors, smart factory equipment, wireless inventory trackers, biometric cyber security scanners, or the like. The user device 102 may include and/or may be associated with a communication interface to communicate (e.g., receive and/or transmit) data.

The biometric unit 106 may enable identification, authentication, and/or access control. In some aspects, the biometric unit 106 may include a biometric sensor for sensing and/or capturing biometric information associated with a user. Such biometric information may include, for example, fingerprint, palm print, finger shape, palm shape, voice, retina, iris, face image, sound, dynamic signature, blood vessel pattern, keystroke, or a combination thereof. The biometric unit 106 may utilize the associated processor to correlate the captured biometric information with user information, and to store a correlation of the biometric information with the user information in the associated memory. Further, the biometric unit 106 may enable comparison of received biometric information with stored biometric information to verify and/or authenticate that the received biometric information is associated with the user information (e.g., belongs to the user).

The TPM device 108 may include a dedicated controller utilizing integrated cryptographic keys (e.g., master keys) and/or cryptographic algorithms to operate as a secure crypto processor. The TPM device 108 may carry out cryptographic operations, embedded in a packaging with multiple physical security measures, which give it a degree of tamper resistance. In some aspects, the TPM device 108 may refrain from communicating the cryptographic keys (e.g., master keys, etc.) and/or the cryptographic algorithms externally (e.g., external to the TPM device 108).

The security infrastructure 110 may include the processing unit 112 and the database 114. The processing unit 112 may include a logical component configured to perform complex operations to evaluate various factors associated with providing the cyber security services. The database 114 may store various pieces of information associated with providing the cyber security services, including security algorithms, encrypted content, and/or encryption/decryption key information. The security infrastructure 110 may include or be associated with a communication interface (e.g., communication interface 670) to communicate (e.g., transmit and/or receive) data.

The security infrastructure 110 may configure and provide the security application 104 for installation to enable the user device 102 to communicate with an application programming interface (API) (not shown) included in the security infrastructure 110 and/or for obtaining the cyber security services. As discussed below in further detail with respect to FIG. 2, the security application 104 may be configured to enable utilization of the biometric unit 106 and/or the TPM device 108 by (an operating system of) the user device 102 to enable secure authentication of the user device 102 or another user device 102 with the network service provider 116. Further, the security application 104 and/or the security infrastructure 110 may utilize one or more encryption and decryption algorithms to encrypt and decrypt the data. The encryption algorithms and decryption algorithms may employ standards such as, for example, data encryption standards (DES), advanced encryption standards (AES), Rivest-Shamir-Adleman (RSA) encryption standard, Open PGP standards, file encryption overview, disk encryption overview, email encryption overview, etc. Some examples of encryption algorithms include a triple data encryption standard (DES) algorithm, Rivest-Shamir-Adleman (RSA) encryption algorithm, advanced encryption standards (AES) algorithms, Twofish encryption algorithms, Blowfish encryption algorithms, IDEA encryption algorithms, MD5 encryption algorithms, HMAC encryption algorithms, etc.

The network service provider 116 may own and operate an infrastructure associated with providing the network services. To access the network services, the network service provider 116 may enable the user device 120 to set up an authentication system. Upon communication of credentials by the user device 102, the network service provider 116 may authenticate the credentials and provide the user device 102 with access to the network services when the credentials are successfully authenticated.

The network 120 may be wired or wireless network. In some aspects, the network 120 may include one or more of, for example, a phone line, a local-area network (LAN), a wide-area network (WAN), a metropolitan-area network (MAN), a home-area network (HAN), Internet, Intranet, Extranet, and Internetwork. In some aspects, the network 120 may include a digital telecommunication network that permits several nodes to share and access resources.

As indicated above, FIG. 1 is provided as an example. Other examples may differ from what is described with regard to FIG. 1.

Multiple user devices may be associated with an account registered with a network service provider to receive network services. The network services may include a service provided over a network (e.g., Internet) such as, for example, electronic mail services, social media services, messaging services, virtual private network (VPN) services, data storage and protection services, or a combination thereof. To gain access to the network services, an authentication system may be set up with the network service provider.

Traditionally, the authentication system may include a single-factor authentication system or a multi-factor authentication system. In the single-factor authentication system, the user device may communicate a first factor such as, for example, a username and/or a password for authentication by the network service provider. Upon successful authentication of the first factor, the network service provider may provide the user device with the network services. In multi-factor authentication, upon successful authentication of the first factor, the user device may determine and communicate a second factor (e.g., pin, token, alphanumeric string, or a combination thereof) for further authentication by the network service provider. The second factor may be different and/or independent from the first factor. Based at least in part on successful authentication of the second factor, the network service provider may provide the user device with access to the network services.

Security associated with the multi-factor authentication system may be enhanced by associating verification of biometric information with determining of the first factor and the second factor. In an example, during authentication, a user device may receive biometric information and verify that the received biometric information belongs to an authorized user. Based at least in part on successful verification of the received biometric information, the user device may determine and communicate the first factor for authentication. Similarly, based at least in part on successful authentication of the first factor, the user device may again receive biometric information and verify that the received biometric information belongs to the authorized user. Based at least in part on successful verification of the again received biometric information, the user device may determine and communicate the second factor for authentication. Based at least in part on successful authentication of the second factor, the network service provider may provide the user device with access to the network services.

In some cases, a given user device, from among the multiple user devices, associated with the registered account may be unable to receive and/or verify biometric information during authentication. In an example, the given user device may not be equipped with a biometric unit. In another example, a biometric unit included in the given user device may malfunction during authentication. In such cases, the given user device may be unable to receive the network services. This may result in the given user device and/or the network service provider inefficiently utilizing resources (e.g., management resources, network resources, financial resources, time resources, processing resources, memory resources, power consumption resources, battery life, or the like) to attempt to obtain the network services. Additionally, a separate user device (instead of the given user device) that is capable of receiving and/or verifying biometric information may have to be utilized to receive the network services, which may be inconvenient and/or may delay receipt of the network services.

Various aspects of systems and techniques discussed in the present disclosure provide a secure cross-device authentication system. The secure cross-device authentication system may include a security infrastructure and/or respective security applications installed on multiple user devices associated with an account registered with a network service provider, which may provide network services to the multiple user devices. In some aspects, the security infrastructure may provide the multiple user devices with the respective security applications. A respective security application may be configured to enable utilization of a respective local biometric unit and/or a respective local TPM device to enable secure authentication of the local user device (e.g., the device on which the respective application is installed) with the network service provider to enable the local user device to receive the network services. Additionally, a respective security application may be configured to enable utilization of a local biometric unit and/or a TPM device to enable secure authentication of another user device with the network service provider to enable the other user device to receive the network services. In this way, even when the other user device is not equipped with a biometric unit or experiences a malfunctioning biometric unit during authentication, and the other user device is unable to receive and/or verify biometric information, the other user device may be securely authenticated with the network service provider. As a result, the respective security applications may enable efficient utilization of resources (e.g., management resources, network resources, financial resources, time resources, processing resources, memory resources, power consumption resources, battery life, or the like) by the user devices and/or the network service provider. Additionally, the respective security applications may avoid having to utilize a separate user device to receive the network services, thereby reducing an inconvenience associated with receiving the network services and/or avoiding a delay in receiving the network services.

In some aspects, a processor executing the security application may determine unavailability of a first biometric unit associated with the first user device for verification of first biometric information; select, based at least in part on determining unavailability of the first biometric unit, a second biometric unit associated with a second user device for verification of second biometric information; receive, from the second user device based at least in part on a first verification of the second biometric information, a first factor associated with authentication of the first user device by a service provider; receive, from the second user device based at least in part on successful authentication of the first factor and on a second verification of the second biometric information, a second factor associated with authentication of the first user device by the service provider; and receive, from the service provider, a service based at least in part on successful authentication of the second factor.

FIG. 2 is an illustration of an example flow 200 associated with a secure cross-device authentication system, according to various aspects of the present disclosure. The example flow 200 may include a first user device (e.g., user device 102) and a second user device (e.g., user device 102) obtaining cyber security services from a security infrastructure (e.g., security infrastructure 110). The first user device may include a first security application (e.g., a first instance of security application 104) and a first TPM device (e.g., TPM device 108). In some aspects, the first user device may experience a malfunctioning first biometric unit (e.g., biometric unit 106) during authentication. As a result, the first user device may be unable to receive and/or verify biometric information when the first user device is to receive network services from a network service provider (e.g., network service provider 116). The second user device may include a second security application (e.g., a second instance of security application 104), a second biometric unit 106 (not shown), and a second TPM device 108. As discussed below in further detail, the security infrastructure 110 may configure and provide the security applications to the first and second user devices for purposes of authenticating the first user device with the network service provider. Although only two user devices are shown in FIG. 2, the present disclosure contemplates any number of user devices being included in the secure cross-device authentication system.

The security applications (e.g., the first security application and the second security application) may respectively enable the user devices (e.g., the first user device and the second user device) to receive information to be processed by the security applications and/or by the security infrastructure 110. Each security application may include a graphical interface to receive the information via a local input interface (e.g., touch screen, keyboard, mouse, pointer, camera, etc.) associated with each user device. The information may be received via text input or via a selection from among a plurality of options (e.g., pull down menu, etc.). In some aspects, each security application may be configured to activate and/or enable, at a time associated with receiving the information, the graphical interface to receive the information. In an example, the first security application may cause a screen (e.g., local screen) associated with the first user device to display, for example, a pop-up message to request entry of the information. Each security application may also enable transmission of at least a portion of the received information to the security infrastructure 110.

As shown by reference numeral 205, the first security application may associate verification of biometric information with operation of the first TPM device and the second security application may associate verification of biometric information with operation of the second TPM device. With respect to the first user device, the first security application may determine availability of the first biometric unit and of the first TPM device. To determine availability of the first biometric unit and of the first TPM device, the first security application may request and receive, from an operating system being utilized by the first user device, information indicating that the first biometric unit and the first TPM device are associated with the operating system.

In some aspects, the first security application may determine that the first user device is not equipped with the first biometric unit or that the first biometric unit has malfunctioned. In this case, the first security application may associate verification of biometric information, obtained from another device (e.g., second user device) associated with the registered account, with operation of the first TPM device. The first security application may associate verification of the biometric information with operation of the first TPM device such that a request for the first TPM device to, for example, sign data, encrypt data, and/or decrypt data is to indicate or be accompanied by a result of successful verification of biometric information. In some aspects, the first security application may associate verification of the biometric information with operation of the first TPM device such that the first security application is to transmit a request for the first TPM device to, for example, sign data, encrypt data, and/or decrypt data, based at least in part on real-time verification of biometric information by the other user device. In other words, the first security application is to transmit the request for the first TPM device to, for example, sign data, encrypt data, and/or decrypt data based at least in part on verification of biometric information by the other user device at a time associated with the first security application transmitting the request.

With respect to the second user device, the second security application may determine availability of the second biometric unit and of the second TPM device. To determine availability of the second biometric unit and of the second TPM device, the second security application may request and receive, from an operating system being utilized by the second user device, information indicating that the second biometric unit and the second TPM device are associated with the operating system.

Based at least in part on determining availability of the second biometric unit and of the second TPM device, the second security application may utilize the operating system to associate real-time verification of biometric information with operation of the second TPM device. For instance, the second security application may associate verification of biometric information with, for example, signing of data by the second TPM device, encrypting of data by the second TPM device, and/or decrypting of data by the second TPM device. The associating of verification of biometric information with operation of the second TPM device may be such that a request for the second TPM device to, for example, sign data, encrypt data, and/or decrypt data is to indicate or be accompanied by a result of successful verification of biometric information. In some aspects, the second security application may associate verification of the biometric information with operation of the second TPM device such that the second security application is to transmit a request for the second TPM device to, for example, sign data, encrypt data, and/or decrypt data, based at least in part on real-time verification of biometric information. In other words, the second security application is to transmit the request for the second TPM device to, for example, sign data, encrypt data, and/or decrypt data based at least in part on verification of biometric information at a time associated with the first security application transmitting the request.

To associate verification of biometric information with operation of the second TPM device, the second security application may, for example, display a pop-up message on a screen associated with the second user device to request biometric information from an authorized user of the second user device. Further, the second security application may enable (e.g., cause) the operating system to activate the second biometric unit to sense the biometric information. The second security application may receive and store, in an associated memory, the biometric information that belongs to the authorized user as authentic biometric information. In some aspects, the authorized user associated with the second user device may be the authorized user associated with the first user device. In some aspects, the authorized user associated with the second user device may be different from the authorized user associated with the first user device.

When the second security application is to transmit a request for the second TPM device to, for example, sign data, encrypt data, and/or decrypt data, the second security application may verify biometric information in real time. In an example, to verify the biometric information, the second security application may enable (e.g., cause) the operating system to activate the second biometric unit to receive biometric information in real time (e.g., at a time associated with transmitting the request). Further, the second security application may compare the received biometric information with the authentic biometric information stored in the associated memory. When the received biometric information matches (e.g., is the same as) the stored authentic biometric information, the second security application may determine that the received biometric information belongs to the authorized user and may select to transmit the request for the second TPM device to, for example, sign data, encrypt data, and/or decrypt data. In some aspects, the request may indicate or include a result of the received biometric information matching the authentic biometric information (e.g., successful authentication) to the second TPM device. Alternatively, when the received biometric information fails to match (e.g., is different from) the stored authentic biometric information, the second security application may determine that the received biometric information does not belong to the authorized user and may select to refrain from transmitting the request for the TPM device to, for example, sign data, encrypt data, and/or decrypt data.

The first user device and the second user device may receive network services from the network service provider. The network services may include a service provided over a network (e.g., Internet) such as, for example, electronic mail services, social media services, messaging services, virtual private network (VPN) services, data storage and protection services, or a combination thereof. To gain access to the network services, the first user device and/or the second user device may register an account with the network service provider. In some aspects, the first user device and the second user device may be associated with the account registered with the network service provider. Further, to receive the network services, the first user device and/or the second user device may set up an authentication system with the network service provider.

The authentication system may include a multi-factor authentication system. When the first user device and/or the second user device is to receive the network services, the first user device and/or the second user device may utilize a web browser and/or a network service provider (NSP) application to determine and communicate a first factor such as, for example, a username and/or a password for authentication by the network service provider 116. Based at least in part on successful authentication of the first factor, the first user device and/or the second user device may determine and communicate a second factor (e.g., pin, token, alphanumeric string, or a combination thereof) for further authentication by the network service provider. In some aspects, the second factor may be variable, varying based at least in part on a time reference (e.g., Unix time) and/or may be valid for a predetermined duration of time. In this case, to determine the second factor, the first user device and/or the second user device may utilize a security algorithm along with secret information (e.g., seed information, QR code, or a combination thereof) provided by the network service provider in association with the registered account. The second factor may be different and/or independent from the first factor. The first user device and/or the second user device may communicate the second factor to the network service provider for authentication with the predetermined duration of time. Based at least in part on successful authentication of the second factor, the network service provider may provide the first user device and/or the second user device with the network services.

As shown by reference numeral 210, the first user device may transmit first registration information to the security infrastructure 110 and the second user device may transmit a second registration information to the security infrastructure 110.

With respect to the first user device, the first security application may determine the first registration information based at least in part on requesting and receiving entry of the first registration information and/or via requesting and receiving access to account registered with the network service provider.

The first registration information may include, for example, metadata associated with the account registered with the network service provider (e.g., account number) and/or data associated with the network services to be received from the network service provider. In some aspects, the metadata may include information regarding the network service provider such as, for example, communication information (e.g., domain information, IP address, or the like) associated with communicating with the network service provider, subscription information associated with the network services to be received, or the like.

The first registration information may also include first identification information associated with identifying the first user device with the security infrastructure 110. In an example, the first identification information may include a unique first installation identifier associated with installing the first security application on the first user device. The first security application may determine the first installation identifier based at least in part on information associated with the first user device installing a present (e.g., existing) instance of the first security application. In some aspects, the security infrastructure 110 may provide the first installation identifier to the first user device in association with the first user device installing the first security application. In some aspects, the security infrastructure 110 may store the first installation identifier in the first security application.

The first identification information may also include a first master public key associated with the first TPM device included in the first user device. In some aspects, the first security application may request the first TPM device to determine a first master key. In some aspects, the first master key may be associated with signing, encrypting, and/or decrypting of data by the first TPM device. The first master key may include an asymmetric master key pair including the first master public key and a first master private key. In some aspects, only the first TPM device may have access to the first master private key (e.g., the first TPM device may keep the first master key confidential). Based at least in part on determining the first master key, the first TPM device may return a unique first identifier associated with (e.g., that identifies) the first master private key to the first security application. In some aspects, the first master key and/or the first identifier may be specific to (e.g., may be utilized by) the first user device.

Based at least in part on receiving the first registration information, the security infrastructure 110 may optionally confirm possession of the first master private key by the first user device. To do so, the security infrastructure 110 may conduct a first challenge-response procedure with the first user device. In an example, the security infrastructure 110 may determine first validation data to be utilized during the first challenge-response procedure. The first validation data may include, for example, an alphanumeric string, a one-time password, or a combination thereof. The alphanumeric string and/or the one-time password may include random and unbiased characters.

The security infrastructure 110 may challenge the first user device to sign the first validation data by transmitting the first validation data to the first security application. The first security application may transmit a first signature request to the first TPM device to sign the first validation data. Prior to transmitting the first signature request, the first security application may request the second user device to verify biometric information in real-time. The first signature request may include the first identifier in association with the first validation data received from the security infrastructure 110, and may indicate a result of successful verification of biometric information by the second user device. Based at least in part on the first signature request including the first identifier in association with the first validation data, the first security application may indicate to the first TPM device that the first master private key, associated with the first identifier, is to be utilized to sign the first validation data. In other words, based at least in part on transmitting the first identifier in association with the first validation data, the first security application may enable the first TPM device to utilize the first master private key, identified by the first identifier, to sign the first validation data.

Based at least in part on receiving the first signature request, the first TPM device may sign the first validation data. In an example, the first TPM device may determine successful verification of biometric information. Further, the first TPM device may determine that the first validation data is to be signed using the first master private key based at least in part on the first validation data being received in association with the first identifier, as indicated by the first signature request. As a result, the first TPM device may utilize the first master private key to sign the first validation data. In some aspects, the first TPM device may utilize a hash function (e.g., SHA 1, MD5, etc.) to hash characters included in the first validation data and may encrypt the hashed characters with the first master private key. The first TPM device may provide the signed validation data to the first security application.

In turn, the first security application may respond to the challenge by transmitting the signed first validation data to the security infrastructure 110, which may utilize the first master public key to validate the signed first validation data. In an example, the security infrastructure 110 may utilize the association between the first master public key and the first master private key to validate the signed first validation data. For instance, the security infrastructure 110 may calculate a hash of the characters included in the first validation data. Further, the security infrastructure 110 may attempt to decrypt the signed first validation data with the first master public key to receive the hashed characters included in the signed first validation data. The security infrastructure 110 may compare the calculated hash with the hashed characters included in the first validation data. When the result of the comparison indicates that the calculated hash matches (e.g., is the same as) the hashed characters included in the first validation data, the security infrastructure 110 may determine that the first user device, to which the security infrastructure 110 had transmitted the first validation data, has signed the first validation data by utilizing the first master private key. In other words, the security infrastructure 110 may determine that the first user device has adequately responded to the challenge. In this case, the security infrastructure 110 may determine that the first user device is in possession of the first master private key. The security infrastructure 110 may store, in a memory (e.g., database 114), the received first registration information in correlation with the first user device.

With respect to the second user device, the second security application may determine the second registration information based at least in part on requesting and receiving entry of the second registration information and/or via requesting and receiving access to account registered with the network service provider.

The second registration information may include, for example, metadata associated with the account registered with the network service provider (e.g., account number) and/or data associated with the network services to be received from the network service provider. In some aspects, the metadata may include information regarding the network service provider such as, for example, communication information (e.g., domain information, IP address, or the like) associated with communicating with the network service provider, subscription information associated with the network services to be received, or the like.

The second registration information may also include second identification information associated with identifying the second user device with the security infrastructure 110. In an example, the second identification information may include a unique second installation identifier associated with installing the second security application on the second user device. The second security application may determine the second installation identifier based at least in part on information associated with the second user device installing a present (e.g., existing) instance of the second security application. In some aspects, the security infrastructure 110 may provide the second installation identifier to the second user device in association with the second user device installing the second security application. In some aspects, the security infrastructure 110 may store the second installation identifier in the second security application.

Further, the second identification information may include a second master public key associated with the second TPM device included in the second user device. In some aspects, the second security application may request the second TPM device to determine a second master key. In some aspects, the second master key may be associated with signing, encrypting, and/or decrypting of data by the second TPM device. The second master key may include an asymmetric master key pair including the second master public key and a second master private key. In some aspects, only the second TPM device may have access to the second master private key (e.g., the second TPM device may keep the second master key confidential). Based at least in part on determining the second master key, the second TPM device may return a unique second identifier associated with (e.g., that identifies) the second master private key to the second security application. In some aspects, the second master key and/or the second identifier may be specific to (e.g., may be utilized by) the second user device.

In some aspects, based at least in part on receiving the second registration information, the security infrastructure 110 may optionally confirm possession of the second master private key by the second user device. To do so, the security infrastructure 110 may conduct a second challenge-response procedure with the second user device. In an example, the security infrastructure 110 may determine second validation data to be utilized during the second challenge-response procedure. The second validation data may include, for example, an alphanumeric string, a one-time password, or a combination thereof. The alphanumeric string and/or the one-time password may include random and unbiased characters.

The security infrastructure 110 may challenge the second user device to sign the second validation data by transmitting the second validation data to the second security application. The second security application may transmit a second signature request to the second TPM device to sign the second validation data. The second signature request may include the second identifier in association with the second validation data received from the security infrastructure 110. Based at least in part on the second signature request including the second identifier in association with the second validation data, the second security application may indicate to the second TPM device that the second master private key, associated with the second identifier, is to be utilized to sign the second validation data. In other words, based at least in part on transmitting the second identifier in association with the second validation data, the second security application may enable the second TPM device to utilize the second master private key, identified by the second identifier, to sign the second validation data.

In some aspects, operation of the second TPM device to sign, encrypt, and/or decrypt data may be associated with the verification of biometric information such that a request or the second TPM device to sign, encrypt, and/or decrypt data is to indicate successful verification of biometric information. In this case, the second signature request may indicate and/or include a result of the second security application verifying biometric information. In an example, the second security application may receive and verify biometric information in real time (e.g., while transmitting the second signature request), as discussed elsewhere herein. When the received biometric information matches stored authentic biometric information associated with an authorized user, the second security application may determine that the received biometric information belongs to the authorized user and may select to transmit the second signature request. Further, the second security application may configure the second signature request to indicate successful verification of the received biometric information.

Based at least in part on receiving the second signature request, the second TPM device may sign the second validation data. In an example, the second TPM device may determine, from the indicated successful verification of the received biometric information, that the received biometric information matches the stored authentic biometric information. Further, the second TPM device may determine that the second validation data is to be signed using the second master private key based at least in part on the second validation data being received in association with the second identifier, as indicated by the second signature request. As a result, the second TPM device may utilize the second master private key to sign the second validation data. In some aspects, the second TPM device may utilize a hash function (e.g., SHA 1, MD5, etc.) to hash characters included in the second validation data and may encrypt the hashed characters with the second master private key. The second TPM device may provide the signed validation data to the second security application.

In turn, the second security application may respond to the challenge by transmitting the signed second validation data to the security infrastructure 110, which may utilize the second master public key to validate the signed second validation data. In an example, the security infrastructure 110 may utilize the association between the second master public key and the second master private key to validate the signed second validation data. For instance, the security infrastructure 110 may calculate a hash of the characters included in the second validation data. Further, the security infrastructure 110 may attempt to decrypt the signed second validation data with the second master public key to receive the hashed characters included in the signed second validation data. The security infrastructure 110 may compare the calculated hash with the hashed characters included in the second validation data. When the result of the comparison indicates that the calculated hash matches (e.g., is the same as) the hashed characters included in the second validation data, the security infrastructure 110 may determine that the second user device, to which the security infrastructure 110 had transmitted the second validation data, has signed the second validation data by utilizing the second master private key. In other words, the security infrastructure 110 may determine that the second user device has adequately responded to the challenge. In this case, the security infrastructure 110 may determine that the second user device is in possession of the second master private key.

As shown by reference numeral 215, the security infrastructure 110 may correlate and/or store, in the memory (e.g., database 114), received registration information. In an example, the security infrastructure 110 may compare the received registration information with all previously stored registration information. In this case, the security infrastructure 110 may compare the second registration information with the first registration information. Based at least in part on a result of the comparison, the security infrastructure 110 may determine that metadata (e.g., account number with the network service provider) included in the second registration information matches (e.g., is the same as) metadata (e.g., account number with the network service provider) included in the first registration information. As a result, the security infrastructure 110 may determine that the first user device and the second user device are both associated with the account registered with the network service provider. Further, the security infrastructure 110 may store correlation information indicating that the first user device and the second user device are both associated with the account registered with the network service provider. In a similar and/or analogous manner, when the security device 110 receives third registration from a third user device (not shown) associated with the account registered with the network service provider, the security device 110 may store correlation information indicating that the first user device, the second user device, and the third user device are associated with the account registered with the network service provider, and so on.

When the first user device is to receive a network service, the first security application may authenticate the first user device with the network service provider. To do so, the first security application may determine availability of the first biometric unit. In some aspects, as shown by reference numeral 220, the first security application may determine that the first biometric unit is unavailable. In an example, the operating system being utilized by the first user device may indicate to the first security application that the first biometric unit is unavailable based at least in part on a malfunction associated with the first biometric unit. In this case, the first security application may determine that the first user device is to rely on another user device (e.g., the second user device or the third user device) associated with the registered account for authentication with the network service provider. In some aspects, when the first user device is not equipped with the first biometric unit, the first security application may similarly determine that the first user device is to rely on another user device (e.g., the second user device or the third user device) associated with the registered account for authentication with the network service provider.

Based at least in part on such a determination, as shown by reference numeral 225, the first security application may transmit an authentication request to the security infrastructure 110. The authentication request may include a request for the security infrastructure 110 to determine and provide a list of other user devices associated with the registered account, the other user devices including currently available biometric units.

Based at least in part on receiving the authentication request from the first security application, the security infrastructure 110 may utilize the stored correlation information to determine the list of user devices associated with the registered account, with which the first user device is also associated. As a result, the security infrastructure 110 may determine that any number of user devices including the second user device and the third user device is associated with the registered account, with which the first user device is also associated. Further, the security infrastructure 110 may determine the list to include the any number of user devices including first user device and the third user device.

In some aspects, prior to determining the list, the security infrastructure 110 may confirm current statuses (e.g., availability) of respective biometric units with the any number of user devices. In an example, as shown by reference numeral 230, the security infrastructure 110 may transmit a status message to the second user device requesting the second user device to provide a status associated with current availability of the second biometric unit and another status message to the third user device requesting the third user device to provide a status associated with current availability of the third biometric unit. In some aspects, the security infrastructure 110 may identify the first user device in the status messages and may receive responses that identify the first user device to allow the security infrastructure 110 to efficiently track status messages and responses associated with the first user device. In some aspects, the status messages may also identify a network service to be received by the first user device.

Based at least in part on receiving the status message, the second user device may determine availability of the second biometric unit, as discussed elsewhere herein (e.g., block 205). When the second security application determines that the second biometric unit is currently available, the second security application may indicate the current availability of the second biometric unit to the security infrastructure 110. In this case, the security infrastructure 110 may determine the list to include the second user device. Alternatively, when the third security application determines that the third biometric unit is currently unavailable, the third security application may indicate the current unavailability of the third biometric unit to the security infrastructure 110. In this case, the security infrastructure 110 may determine the list to exclude the third user device.

Based at least in part on determining the list of user devices, as shown by reference numeral 235, the security infrastructure 110 may transmit the list of user devices to the first security application. Based at least in part on receiving the list of user devices, as shown by reference numeral 240, the first security application may transmit a selection message to the security infrastructure 110, the selection message indicating selection of select a user device listed in the list of user devices to enable authentication of the first user device with the network service provider. In an example, the selection message may indicate selection of the second user device to enable authentication of the first user device with the network service provider. In some aspects, selection of the second user device may be based at least in part on availability of an authorized user to provide biometric information. In an example, the first user device may select the second user device based at least in part on the second user device being currently located near the first user device. In another example, the first user device may select the second user device based at least in part on an understanding that the authorized user is available to provide biometric information by utilizing the second biometric unit.

Based at least in part on receiving the selection message, the security infrastructure 110 may determine that the second user device is to be utilized to enable authentication of the first user device with the network service provider. In this case, as shown by reference numeral 245, the security infrastructure 110 may transmit an authentication message to indicate to the second user device that the second user device is to enable authentication of the first user device with the network service provider. The authentication message may include, for example, the first installation identifier associated with the first security application and/or the first master public key associated with the first TPM device.

As shown by reference numeral 250, the first user device, the security infrastructure 110, and the second user device may authenticate the first user device with the network service provider. Based at least in part on receiving the authentication message, the second security application may utilize the second biometric unit and the second TPM device to determine the first factor based at least in part on verifying biometric information. Based at least in part on successful verification of biometric information in real time (e.g., during encrypting the first factor), the second security application may encrypt the first factor based at least in part on utilizing the first master public key associated with the first TPM device. The second security application may transmit the encrypted first factor to the security infrastructure 110, which may relay (e.g., transmit) the encrypted first factor to the first security application. In some aspects, the second security application may also transmit an indication that biometric information was verified in real time while determining the first factor. In some aspects, the second security application may also transmit the first installation identifier, associated with the first security application, in association with the encrypted first factor.

The first security application may transmit a first decryption request to the first TPM device. The first decryption request may include the first unique identifier and/or the first master public key in association with the encrypted first factor to indicate to the first TPM device that the encrypted first factor is to be decrypted based at least in part on utilizing the first master key associated with the first unique identifier and/or the first master public key. The first decryption request may also indicate and/or include a result of the successful verification of biometric information in real time by the second security application.

Based at least in part on receiving the first decryption request, the first TPM device may determine, from the included and/or indicated result of the successful verification, that the received biometric information matches the stored authentic biometric information. Further, the first TPM device may determine that the encrypted first factor is to be decrypted using the first master private key associated with the first master public key, as indicated by the first decryption request. As a result, the first TPM device may decrypt the encrypted first factor and provide the first factor to the first security application. The first security application may communicate the first factor to the network service provider for authentication. Based at least in part on successful authentication of the first factor, the network service provider may prompt the first user device to communicate the second factor within the predetermined duration of time.

Based at least in part on receiving the prompt, the first user device may request the second user device (via the security infrastructure 110) to determine and provide the second factor. In this case, the second security application may utilize the second biometric unit and the second TPM device to determine the second factor based at least in part on utilizing the secret information and the security algorithm, as discussed later on.

Based at least in part on successful verification of the biometric information in real time (e.g., during encrypting the second factor), the second security application may encrypt the second factor based at least in part on utilizing the first master public key associated with the first TPM device. The second security application may transmit the encrypted second factor to the security infrastructure 110, which may relay (e.g., transmit) the encrypted second factor to the first security application within the predetermined duration of time. In some aspects, the second security application may also transmit the first installation identifier, associated with the first security application, in association with the encrypted second factor.

The first security application may transmit a second decryption request to the first TPM device. The second decryption request may include the first unique identifier and/or the first master public key in association with the encrypted second factor to indicate to the first TPM device that the encrypted second factor is to be decrypted based at least in part on utilizing the first master private key associated with the first unique identifier and/or the first master public key. The second decryption request may also indicate and/or include a result of the successful verification of biometric information by the second security application.

Based at least in part on receiving the second decryption request, the first TPM device may determine, from the included and/or indicated result of the successful verification, that the received biometric information matches the stored authentic biometric information. Further, the first TPM device may determine that the encrypted second factor is to be decrypted using the first master private key associated with the first master public key, as indicated by the second decryption request. As a result, the first TPM device may decrypt the encrypted second factor and provide the second factor to the first security application. The first security application may communicate, within the predetermined duration of time, the second factor to the network service provider for authentication. Based at least in part on successful authentication of the second factor, the network service provider may provide the first user device with the network services.

In this way, even when the first user device is not equipped with a biometric unit or experiences a malfunctioning biometric unit, and the first user device is unable to receive and/or verify biometric information, the first user device may be securely authenticated with the network service provider. As a result, the first security application and the second security application may enable efficient utilization of resources (e.g., management resources, network resources, financial resources, time resources, processing resources, memory resources, power consumption resources, battery life, or the like) by the user devices and/or the network service provider. Additionally, the first security application and the second security application may avoid having to utilize a separate user device to receive the network services, thereby reducing an inconvenience associated with receiving the network services and/or avoiding a delay in receiving the network services.

In some aspects, the security infrastructure 110 may enable the first user device and the second user device to be included in a mesh network based at least in part on determining that the first user device and the second user device are associated with the same account registered with the network service provider. As a result, the first user device and the second user device may establish a meshnet connection to communicate with each other without the security infrastructure 110 relaying messages between the first user device and the second user device. In some aspects, the data communicated by the first user device and the second user device via the meshnet connection may be encrypted.

In some aspects, the network service provider may be owned or operated or included within the security infrastructure 110.

Determination of the first factor and the second factor by the second security application, the second biometric unit, and the second TPM device based at least in part on verifying biometric information will now be discussed.

In some aspects, during registration of the account, the second security application may determine authentication information, which may include first factor authentication information and second factor authentication information. The first factor authentication information may include, for example, information associated with determining a first factor such as, for example, a username and/or a password associated with authenticating with the network service provider. In an example, the first factor authentication information may include predetermined information such as, for example, a hint, a question, and/or a string of alphanumeric characters to enable the second security application to determine the first factor in real time (e.g., during authentication with the network service provider). The second factor authentication information may include predetermined information such as, for example, secret information associated with determining the second factor (e.g., one-time password, one-time pin, one-time token, or the like). In some aspects, based at least in part on utilizing the secret information in association with, for example, a security algorithm, the second security application may determine the second factor in real time (e.g., during authentication with the network service provider). In an example, the security algorithm may include a one-time password algorithm, a time-based one-time password algorithm, or the like.

The second security application may encrypt authentication information. In some aspects, the second security application may determine a first cryptographic key and may encrypt the first factor authentication information based at least in part on utilizing the first cryptographic key. Further, the second security application may determine a second cryptographic key and may encrypt the second factor authentication information (e.g., secret information) based at least in part on utilizing the second cryptographic key. In some aspects, the first cryptographic key and the second cryptographic key may include respective symmetric cryptographic keys.

The second security application may store encryption information including, for example, encrypted first factor authentication information and encrypted second factor authentication information in a memory (e.g., memory 630) associated with the second user device and/or in a memory (e.g., database 114) associated with the security infrastructure 110.

The second security application may transmit to the second TPM device encryption requests to encrypt the cryptographic keys. In some aspects, the encryption requests may include a first encryption request to encrypt the first cryptographic key based at least in part on utilizing the second master key. When the second master key includes a symmetric second master key, the TPM device 108 may utilize the symmetric second master key to encrypt the assigned private key. When the second master key includes a second master public key and a second master private key, the TPM device 108 may utilize the second master public key to encrypt the cryptographic keys. In some aspects, the TPM device 108 may provide the encrypted cryptographic keys to the client application 104. The first encryption request may include the second unique identifier in association with the first cryptographic key to indicate to the second TPM device that the first cryptographic key is to be encrypted based at least in part on utilizing the second master key that is associated with (e.g., identified by) the second unique identifier.

The first encryption request may also include and/or indicate a result of the second security application verifying biometric information. In an example, the second security application may receive and verify biometric information in real time (e.g., while transmitting the first encryption request), as discussed elsewhere herein. When the received biometric information matches the stored authentic biometric information, the second security application may determine that the received biometric information belongs to the authorized user and may select to transmit the first encryption request. Further, the first encryption request may include and/or indicate the result of the successful verification of the received biometric information.

Based at least in part on receiving the first encryption request, the second TPM device may determine, from the included and/or indicated result of the successful verification and/or authentication, that the received biometric information matches the stored authentic biometric information. Further, the second TPM device may determine that the first cryptographic key is to be encrypted using the second master key associated with the second unique identifier, as indicated by the first encryption request. As a result, the second TPM device may encrypt the first cryptographic key based at least in part on utilizing the second master key. In some aspects, the second TPM device may provide the encrypted first cryptographic key to the second security application.

The second security application may transmit a second encryption request to encrypt the second cryptographic key based at least in part on utilizing the second master key. The second encryption request may include the second unique identifier in association with the second cryptographic key to indicate to the second TPM device that the second cryptographic key is to be encrypted based at least in part on utilizing the second master key that is associated with (e.g., identified by) the second unique identifier.

The second encryption request may also include and/or indicate a result of the second security application verifying biometric information. In an example, the second security application may receive and verify biometric information in real time (e.g., while transmitting the second encryption request), as discussed elsewhere herein. When the received biometric information matches the stored authentic biometric information, the second security application may determine that the received biometric information belongs to the authorized user and may select to transmit the second encryption request. Further, the second encryption request may include and/or indicate the result of the successful verification of the received biometric information.

Based at least in part on receiving the second encryption request, the second TPM device may determine, from the included and/or indicated result of the successful verification, that the received biometric information matches the stored authentic biometric information. Further, the second TPM device may determine that the second cryptographic key is to be encrypted using the second master key associated with the second unique identifier, as indicated by the second encryption request. As a result, the second TPM device may encrypt the second cryptographic key based at least in part on utilizing the second master key. In some aspects, the second TPM device may provide the encrypted second cryptographic key to the second security application.

When the first user device is to receive the network services from the network service provider, the second user device/second security application may enable authentication of the first user device with the network service provider.

Based at least in part on receiving the authentication message from the security infrastructure 110, the second security application may retrieve the encrypted first cryptographic key and/or the encrypted second cryptographic key from the memory associated with the second user device. Further, the second security application may transmit to the second TPM device decryption requests to decrypt the encrypted cryptographic keys. In some aspects, the decryption requests may include a first decryption request to decrypt the encrypted first cryptographic key based at least in part on utilizing the second master key. The first decryption request may include the second unique identifier and/or the second master public key in association with the encrypted first cryptographic key to indicate to the second TPM device that the encrypted first cryptographic key is to be decrypted based at least in part on utilizing the second master private key that is associated with (e.g., identified by) the first unique identifier and/or the second master public key. In some aspects, the second TPM device may require the association of the second unique identifier with the encrypted first cryptographic key to indicate to the second TPM device that the encrypted first cryptographic key is to be decrypted based at least in part on utilizing the second master key.

When the second master key includes the symmetric second master key, the TPM device 108 may utilize the symmetric second master key to decrypt the encrypted cryptographic keys. When the second master key includes the second master public key and the second master private key, the TPM device 108 may utilize the second master private key to decrypt the encrypted cryptographic keys. In some aspects, the TPM device 108 may provide the decrypted cryptographic keys to the client application 104.

The first decryption request may also include a result of the second security application verifying biometric information. In an example, the second security application may receive and verify biometric information in real time (e.g., while transmitting the first decryption request), as discussed elsewhere herein. When the received biometric information matches the stored authentic biometric information, the second security application may determine that the received biometric information belongs to the authorized user and may select to transmit the first decryption request. Further, the first decryption request may include and/or indicate the result of the successful verification of the received biometric information.

Based at least in part on receiving the first decryption request, the second TPM device may determine, from the included and/or indicated result of the verification, that the received biometric information matches the stored authentic biometric information. Further, the second TPM device may determine that the encrypted first cryptographic key is to be decrypted using the second master key associated with the first unique identifier, as indicated by the first decryption request. As a result, the second TPM device may decrypt the encrypted first cryptographic key based at least in part on utilizing the second master key.

The second security application may utilize the first cryptographic key to decrypt the first factor authentication information. The second security application may utilize the first factor authentication information to determine the first factor. Also, the second security application may encrypt the first factor based at least in part on utilizing the first master public key associated with the first TPM device. Further, the second security application may transmit the encrypted first factor to the first user device directly or via the security infrastructure 110. In some aspects, the second security application may also transmit an indication that biometric information was verified in real time while determining the first factor. The first security application may decrypt the encrypted first factor, as discussed elsewhere herein, and may communicate the first factor to the network service provider may authenticate the first factor. Based at least in part on successful authentication of the first factor, the network service provider may prompt the first user device for communication of the second factor.

Based at least in part on successful authentication of the first factor, the first security application may request, directly or via the security infrastructure 110, the second security application to determine and provide the second factor within the predetermined duration of time.

In this case, the second security application may transmit a second decryption request to decrypt the encrypted second cryptographic key based at least in part on utilizing the second master key. The second decryption request may include the second unique identifier and/or the second master public key in association with the encrypted second cryptographic key to indicate to the second TPM device that the encrypted second cryptographic key is to be decrypted based at least in part on utilizing the second master key that is associated with (e.g., identified by) the second unique identifier and/or the second master public key. In some aspects, the second TPM device may require the association of the second unique identifier with the encrypted second cryptographic key to indicate to the second TPM device that the encrypted second cryptographic key is to be decrypted based at least in part on utilizing the second master key.

The second decryption request may also include and/or indicate a result of the second security application verifying and authenticating biometric information. In an example, the second security application may receive and verify biometric information in real time (e.g., while transmitting the second decryption request), as discussed elsewhere herein. When the received biometric information matches the stored authentic biometric information, the second security application may determine that the received biometric information belongs to the authorized user and may select to transmit the second decryption request. Further, the second decryption request may include and/or indicate the result of the successful verification of the received biometric information.

Based at least in part on receiving the second decryption request, the second TPM device may determine, from the included and/or indicated result of the successful verification, that the received biometric information matches the stored authentic biometric information. Further, the second TPM device may determine that the encrypted second cryptographic key is to be decrypted using the second master key associated with the second unique identifier and/or the second master public key, as indicated by the second decryption request. As a result, the second TPM device may decrypt the encrypted second cryptographic key based at least in part on utilizing the second master key. In some aspects, the second TPM device may provide the decrypted second cryptographic key to the second security application.

The second security application may utilize the second cryptographic key to decrypt the second factor authentication information. The second security application may utilize the second factor authentication information with the security algorithm to determine the second factor. Also, the second security application may encrypt the second factor based at least in part on utilizing the first master public key associated with the first TPM device. Further, the second security application may transmit the encrypted second factor to the first user device directly or via the security infrastructure 110. In some aspects, the second security application may also transmit an indication that biometric information was verified in real time while determining the second factor. The first security application may decrypt the encrypted second factor, as discussed elsewhere herein, and may communicate the second factor to the network service provider within the predetermined duration of time. The network service provider may authenticate the second factor.

Based at least in part on successful authentication of the second factor, the network service provider may provide the first user device with the network services.

By utilizing the techniques discussed herein, even when a user device is not equipped with a biometric unit or experiences a malfunctioning biometric unit during authentication, and the user device is unable to receive and/or verify biometric information, the user device may be securely authenticated with the network service provider. As a result, respective security applications may enable efficient utilization of resources (e.g., management resources, network resources, financial resources, time resources, processing resources, memory resources, power consumption resources, battery life, or the like) by the user devices and/or the network service provider. Additionally, the respective security applications may avoid having to utilize a separate user device to receive the network services, thereby reducing an inconvenience associated with receiving the network services and/or avoiding a delay in receiving the network services.

As indicated above, FIG. 2 is provided as an example. Other examples may differ from what is described with regard to FIG. 2.

FIG. 3 is an illustration of an example process 300 associated with a secure cross-device authentication system, according to various aspects of the present disclosure. In some aspects, the process 300 may be performed by a memory and/or a processor/controller (e.g., processor 620) associated with a user device (e.g., user device 102) executing a security application. As shown by reference numeral 310, process 300 may include determining, by a first user device, unavailability of a first biometric unit associated with the first user device for verification of first biometric information. For instance, the first user device may utilize the associated processor/controller to determine unavailability of a first biometric unit associated with the first user device for verification of first biometric information, as discussed elsewhere herein.

As shown by reference numeral 320, process 300 may include selecting, by the first user device based at least in part on determining unavailability of the first biometric unit, a second biometric unit associated with a second user device for verification of second biometric information. For instance, the first user device may utilize the associated processor/controller to select, based at least in part on determining unavailability of the first biometric unit, a second biometric unit associated with a second user device for verification of second biometric information, as discussed elsewhere herein.

As shown by reference numeral 330, process 300 may include receiving, by the first user device from the second user device based at least in part on a first verification of the second biometric information, a first factor associated with authentication of the first user device by a service provider. For instance, the first user device may utilize an associated communication interface (e.g., communication interface 670) with the associated processor/controller to receive, from the second user device based at least in part on a first verification of the second biometric information, a first factor associated with authentication of the first user device by a service provider, as discussed elsewhere herein.

As shown by reference numeral 340, process 300 may include receiving, by the first user device from the second user device based at least in part on successful authentication of the first factor and on a second verification of the second biometric information, a second factor associated with authentication of the first user device by the service provider. For instance, the first user device may utilize the associated communication interface and processor/controller to receive, from the second user device based at least in part on successful authentication of the first factor and on a second verification of the second biometric information, a second factor associated with authentication of the first user device by the service provider, as discussed elsewhere herein.

As shown by reference numeral 350, process 300 may include receiving, by the first user device from the service provider, a service based at least in part on successful authentication of the second factor. For instance, the first user device may utilize the associated communication interface and processor/controller to receive, from the service provider, a service based at least in part on successful authentication of the second factor, as discussed elsewhere herein.

Process 300 may include additional aspects, such as any single aspect or any combination of aspects described below and/or in connection with one or more other processes described elsewhere herein.

In a first aspect, in process 300, selecting the second biometric unit includes determining availability of the second biometric unit for verification of the second biometric information.

In a second aspect, alone or in combination with the first aspect, in process 300, receiving the first factor includes receiving the first factor in encrypted form, the first factor being encrypted based at least in part on utilizing a public key associated with a trusted module associated with the first device.

In a third aspect, alone or in combination with the first through second aspects, in process 300, receiving the first factor includes receiving a first indication indicating that the first verification of the second biometric information was successful.

In a fourth aspect, alone or in combination with the first through third aspects, in process 300, receiving the second factor includes receiving the second factor in encrypted form, the second factor being encrypted based at least in part on utilizing a public key associated with a trusted module associated with the first device.

In a fifth aspect, alone or in combination with the first through fourth aspects, in process 300, receiving the second factor includes receiving a second indication indicating that the second verification of the second biometric information was successful.

In a sixth aspect, alone or in combination with the first through fifth aspects, process 300 may include transmitting the first factor to the service provider for authentication; and transmitting the second factor to the service provider for authentication based at least in part on successful authentication of the first factor.

Although FIG. 3 shows example blocks of the process, in some aspects, the process may include additional blocks, fewer blocks, different blocks, or differently arranged blocks than those depicted in FIG. 3. Additionally, or alternatively, two or more of the blocks of the process may be performed in parallel.

As indicated above, FIG. 3 is provided as an example. Other examples may differ from what is described with regard to FIG. 3.

FIG. 4 is an illustration of an example process 400 associated with a secure cross-device authentication system, according to various aspects of the present disclosure. In some aspects, the process 400 may be performed by a memory and/or a processor/controller (e.g., processing unit 112, processor 620) associated with an infrastructure device (e.g., security infrastructure 110) configuring a security application. As shown by reference numeral 410, process 400 may include receiving, by an infrastructure device from a first user device, a request to provide a list of available user devices that are available to be utilized for authenticating the first user device with a service provider. For instance, the infrastructure device may utilize an associated communication interface (e.g., communication interface 670) with the associated processor/controller to receive, from a first user device, a request to provide a list of available user devices that are available to be utilized for authenticating the first user device with a service provider, as discussed elsewhere herein.

As shown by reference numeral 420, process 400 may include receiving, by the infrastructure device from the first user device based at least in part on providing the list of available user devices, a selection message indicating a selection of a second user device, from among the available user devices, for authenticating the first user device with the service provider. For instance, the infrastructure device may utilize the associated communication interface and processor/controller to receive, from the first user device based at least in part on providing the list of available user devices, a selection message indicating a selection of a second user device, from among the available user devices, for authenticating the first user device with the service provider, as discussed elsewhere herein.

As shown by reference numeral 430, process 400 may include transmitting, by the infrastructure device to the second user device based at least in part on receiving the selection message, an authentication message indicating that the second user device is to authenticate the first user device with the service provider. For instance, the infrastructure device may utilize the communication interface and associated processor/controller to transmit, to the second user device based at least in part on receiving the selection message, an authentication message indicating that the second user device is to authenticate the first user device with the service provider, as discussed elsewhere herein.

As shown by reference numeral 440, process 400 may include receiving, by the infrastructure device from the second user device based at least in part on transmitting the authentication message, one or more encrypted authentication factors associated with authenticating the first user device with the service provider. For instance, the infrastructure device may utilize the associated communication interface and processor/controller to receive, from the second user device based at least in part on transmitting the authentication message, one or more encrypted authentication factors associated with authenticating the first user device with the service provider, as discussed elsewhere herein.

As shown by reference numeral 450, process 400 may include transmitting, by the infrastructure device to the first user device, the one or more encrypted factors associated with authenticating the first user device with the service provider. For instance, the infrastructure device may utilize the communication interface and associated processor/controller to transmit, to the first user device, the one or more encrypted factors associated with authenticating the first user device with the service provider, as discussed elsewhere herein.

Process 400 may include additional aspects, such as any single aspect or any combination of aspects described below and/or in connection with one or more other processes described elsewhere herein.

In a first aspect, process 400 may include determining the list of available user devices based at least in part on determining user devices with currently available biometric units.

In a second aspect, alone or in combination with the first aspect, process 400 may include determining one or more user devices to be included in the list of available user devices based at least in part on determining user devices that are associated with the first user device.

In a third aspect, alone or in combination with the first through second aspects, in process 400, receiving the one or more encrypted authentication factors includes receiving a first encrypted authentication factor, and receiving a second encrypted authentication factor based at least in part on successful authentication of the first encrypted authentication factor by the service provider.

In a fourth aspect, alone or in combination with the first through third aspects, in process 400, receiving the one or more encrypted authentication factors includes receiving the one or more encrypted authentication factors based at least in part on verification of biometric information.

In a fifth aspect, alone or in combination with the first through fourth aspects, in process 400, receiving the one or more encrypted authentication factors includes receiving an indication that the encrypted authentication factor is encrypted based at least in part on real-time verification of biometric information.

In a sixth aspect, alone or in combination with the first through fifth aspects, in process 400, receiving the one or more encrypted authentication factors includes receiving an encrypted authentication factor that is encrypted based at least in part on utilizing an encryption key associated with a trusted device included in the first user device.

Although FIG. 4 shows example blocks of the process, in some aspects, the process may include additional blocks, fewer blocks, different blocks, or differently arranged blocks than those depicted in FIG. 4. Additionally, or alternatively, two or more of the blocks of the process may be performed in parallel.

As indicated above, FIG. 4 is provided as an example. Other examples may differ from what is described with regard to FIG. 4.

FIG. 5 is an illustration of an example process 500 associated with a secure cross-device authentication system, according to various aspects of the present disclosure. In some aspects, the process 500 may be performed by a memory and/or a processor/controller (e.g., processor 620) associated with a user device (e.g., second user device 102) executing a security application. As shown by reference numeral 510, process 500 may include receiving, by a second user device, an authentication message indicating that the second user device is to authenticate a first user device with a service provider that provides a service to the first user device. For instance, the second user device may utilize an associated communication interface (e.g., communication interface 670) with the associated memory and processor to receive an authentication message indicating that the second user device is to authenticate a first user device with a service provider that provides a service to the first user device, as discussed elsewhere herein.

As shown by reference numeral 520, process 500 may include determining, by the second user device, one or more authentication factors associated with authenticating the first user device with the service provider. For instance, the second user device may utilize the associated memory and processor to determine one or more authentication factors associated with authenticating the first user device with the service provider, as discussed elsewhere herein.

As shown by reference numeral 530, process 500 may include encrypting, by the second user device, the one or more authentication factors based at least in part on utilizing an encryption key associated with a trusted device included in the first user device. For instance, the second user device may utilize the associated memory and processor to encrypt the one or more authentication factors based at least in part on utilizing an encryption key associated with a trusted device included in the first user device, as discussed elsewhere herein.

As shown by reference numeral 540, process 500 may include transmitting, by the second user device, one or more encrypted authentication factors to enable authentication of the first user device with the service provider. For instance, the second user device may utilize the associated memory and processor to transmit one or more encrypted authentication factors to enable authentication of the first user device with the service provider, as discussed elsewhere herein.

Process 500 may include additional aspects, such as any single aspect or any combination of aspects described below and/or in connection with one or more other processes described elsewhere herein.

In a first aspect, in process 500, determining the one or more authentication factors includes determining a first authentication factor, and determining a second authentication factor based at least in part on successful authentication of the first factor by the service provider.

In a second aspect, alone or in combination with the first aspect, in process 500, determining the one or more authentication factors includes determining a first authentication factor based at least in part on a predetermined string of alphanumeric characters.

In a third aspect, alone or in combination with the first through second aspects, in process 500, determining the one or more authentication factors includes determining a first authentication factor, and determining a second authentication factor based at least in part on predetermined secret information and a security algorithm.

In a fourth aspect, alone or in combination with the first through third aspects, in process 500, encrypting the one or more authentication factors includes verifying biometric information.

In a fifth aspect, alone or in combination with the first through fourth aspects, in process 500, transmitting the one or more encrypted authentication factors includes transmitting an indication indicating successful verification of biometric information.

In a sixth aspect, alone or in combination with the first through fifth aspects, in process 500, receiving the authentication message includes receiving the authentication message based at least in part on a determination that the second user device includes a biometric unit.

Although FIG. 5 shows example blocks of the process, in some aspects, the process may include additional blocks, fewer blocks, different blocks, or differently arranged blocks than those depicted in FIG. 5. Additionally, or alternatively, two or more of the blocks of the process may be performed in parallel.

As indicated above, FIG. 5 is provided as an example. Other examples may differ from what is described with regard to FIG. 5.

FIG. 6 is an illustration of example devices 600, according to various aspects of the present disclosure. In some aspects, the example devices 600 may form part of or implement the systems, environments, infrastructures, components, or the like described elsewhere herein and may be used to perform the example processes described elsewhere herein. The example devices 600 may include a universal bus 610 communicatively coupling a processor 620, a memory 630, a storage component 640, an input component 650, an output component 660, and a communication interface 670.

Bus 610 may include a component that permits communication among multiple components of a device 600. Processor 620 may be implemented in hardware, firmware, and/or a combination of hardware and software. Processor 620 may take the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some aspects, processor 620 may include one or more processors capable of being programmed to perform a function. Memory 630 may include a random access memory (RAM), a read only memory (ROM), and/or another type of dynamic or static storage device (e.g., a flash memory, a magnetic memory, and/or an optical memory) that stores information and/or instructions for use by processor 620.

Storage component 640 may store information and/or software related to the operation and use of a device 600. For example, storage component 640 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 650 may include a component that permits a device 600 to receive information, such as via user input (e.g., a touch screen display, a keyboard, a keypad, a mouse, a button, a switch, and/or a microphone). Additionally, or alternatively, input component 650 may include a component for determining location (e.g., a global positioning system (GPS) component) and/or a sensor (e.g., an accelerometer, a gyroscope, an actuator, another type of positional or environmental sensor, and/or the like). Output component 660 may include a component that provides output information from device 600 (via, for example, a display, a speaker, a haptic feedback component, an audio or visual indicator, and/or the like).

Communication interface 670 may include a transceiver-like component (e.g., a transceiver, a separate receiver, a separate transmitter, and/or the like) that enables a device 600 to communicate with other devices, such as via a wired connection, a wireless connection, or a combination of wired and wireless connections. Communication interface 670 may permit device 600 to receive information from another device and/or provide information to another device. For example, communication interface 670 may include an Ethernet interface, an optical interface, a coaxial interface, an infrared interface, a radio frequency (RF) interface, a universal serial bus (USB) interface, a Wi-Fi interface, a cellular network interface, and/or the like.

A device 600 may perform one or more processes described elsewhere herein. A device 600 may perform these processes based on processor 620 executing software instructions stored by a non-transitory computer-readable medium, such as memory 630 and/or storage component 640. As used herein, the term "computer-readable medium" may refer to a non-transitory memory device. A memory device may include memory space within a single physical storage device or memory space spread across multiple physical storage devices.

Software instructions may be read into memory 630 and/or storage component 640 from another computer-readable medium or from another device via communication interface 670. When executed, software instructions stored in memory 630 and/or storage component 640 may cause processor 620 to perform one or more processes described elsewhere herein. Additionally, or alternatively, hardware circuitry may be used in place of or in combination with software instructions to perform one or more processes described elsewhere herein. Thus, implementations described herein are not limited to any specific combination of hardware circuitry and software.

The quantity and arrangement of components shown in FIG. 6 are provided as an example. In practice, a device 600 may include additional components, fewer components, different components, or differently arranged components than those shown in FIG. 6. Additionally, or alternatively, a set of components (e.g., one or more components) of a device 600 may perform one or more functions described as being performed by another set of components of a device 600.

As indicated above, FIG. 6 is provided as an example. Other examples may differ from what is described with regard to FIG. 6.

Persons of ordinary skill in the art will appreciate that the aspects encompassed by the present disclosure are not limited to the particular exemplary aspects described herein. In that regard, although illustrative aspects have been shown and described, a wide range of modification, change, and substitution is contemplated in the foregoing disclosure. It is understood that such variations may be made to the aspects without departing from the scope of the present disclosure. Accordingly, it is appropriate that the appended claims be construed broadly and in a manner consistent with the present disclosure.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software.

As used herein, satisfying a threshold may, depending on the context, refer to a value being greater than the threshold, greater than or equal to the threshold, less than the threshold, less than or equal to the threshold, equal to the threshold, or not equal to the threshold, among other examples, or combinations thereof.

It will be apparent that systems or methods described herein may be implemented in different forms of hardware, firmware, or a combination of hardware and software. The actual specialized control hardware or software code used to implement these systems or methods is not limiting of the aspects. Thus, the operation and behavior of the systems or methods were described herein without reference to specific software code—it being understood that software and hardware can be designed to implement the systems or methods based, at least in part, on the description herein.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
receiving, by an infrastructure device from a first user device, a request to provide a list of available user devices that are available to be utilized for authenticating the first user device with a service provider that authenticates the first user device in relation to providing a service to the first user device;
receiving, by the infrastructure device from the first user device based at least in part on providing the list of available user devices, a selection message indicating a selection of a second user device, from among the available user devices, to assist with authenticating the first user device with the service provider based at least in part on a determination that a biometric unit is available to the second user device;
transmitting, by the infrastructure device to the second user device based at least in part on receiving the selection message, an authentication message indicating that the second user device is to assist with authenticating the first user device with the service provider;
receiving, by the infrastructure device from the second user device based at least in part on transmitting the authentication message, one or more encrypted authentication factors associated with authenticating the first user device with the service provider, and an indication of successful verification of biometric information; and
transmitting, by the infrastructure device to the first user device, the one or more encrypted factors associated with authenticating the first user device with the service provider.

2. The method of claim 1, further comprising:
determining the list of available user devices based at least in part on determining that biometric units are available to the user devices.

3. The method of claim 1, further comprising:
determining one or more user devices to be included in the list of available user devices based at least in part on determining user devices.

4. The method of claim 1, wherein receiving the one or more encrypted authentication factors includes receiving a first encrypted authentication factor, and receiving a second encrypted authentication factor based at least in part on successful authentication of the first encrypted authentication factor by the service provider.

5. The method of claim 1, wherein receiving the one or more encrypted authentication factors includes receiving the one or more encrypted authentication factors based at least in part on the successful verification of biometric information.

6. The method of claim 1, wherein receiving the one or more encrypted authentication factors includes receiving an indication that the encrypted authentication factor is encrypted based at least in part on real-time verification of the biometric information.

7. The method of claim 1, wherein receiving the one or more encrypted authentication factors includes receiving an encrypted authentication factor that is encrypted based at least in part on utilizing an encryption key associated with a trusted device included in the first user device.

8. An infrastructure device, comprising:
a memory; and
a processor communicatively coupled to the memory, the memory and the processor being configured to:
receive, from a first user device, a request to provide a list of available user devices that are available to be utilized for authenticating the first user device with a service provider that authenticates the first user device in relation to providing a service to the first user device;
receive, from the first user device based at least in part on providing the list of available user devices, to assist with authenticating the first user device with the service provider based at least in part on a determination that a biometric unit is available to the second user device;
transmit, to the second user device based at least in part on receiving the selection message, an authentication message indicating that the second user device is to assist with authenticating the first user device with the service provider;
receive, from the second user device based at least in part on transmitting the authentication message, one or more encrypted authentication factors associated with authenticating the first user device with the service provider, and an indication of successful verification of biometric information; and
transmit, to the first user device, the one or more encrypted factors associated with authenticating the first user device with the service provider.

9. The infrastructure device of claim 8, wherein the memory and the processor are configured to determine the list of available user devices based at least in part on determining that biometric units are available to the user devices.

10. The infrastructure device of claim 8, wherein the memory and the processor are configured to determine one or more user devices to be included in the list of available user devices based at least in part on determining user devices that are associated with the first user device.

11. The infrastructure device of claim 8, wherein, to receive the one or more encrypted authentication factors, the memory and the processor are configured to receive a first encrypted authentication factor, and receiving a second encrypted authentication factor based at least in part on successful authentication of the first encrypted authentication factor by the service provider.

12. The infrastructure device of claim 8, wherein, to receive the one or more encrypted authentication factors, the memory and the processor are configured to receive the one or more encrypted authentication factors based at least in part on the successful verification of biometric information.

13. The infrastructure device of claim 8, wherein, to receive the one or more encrypted authentication factors, the memory and the processor are configured to receive an indication that the encrypted authentication factor is encrypted based at least in part on real-time verification of the biometric information.

14. The infrastructure device of claim 8, wherein, to receive the one or more encrypted authentication factors, the memory and the processor are configured to receive an encrypted authentication factor that is encrypted based at least in part on utilizing an encryption key associated with a trusted device included in the first user device.

15. A non-transitory computer-readable medium configured to store instructions, which when executed by a processor associated with an infrastructure device, configure the processor to:
receive, from a first user device, a request to provide a list of available user devices that are available to be utilized for authenticating the first user device with a service provider that authenticates the first user device in relation to providing a service to the first user device;
receive, from the first user device based at least in part on providing the list of available user devices, to assist with authenticating the first user device with the service provider based at least in part on a determination that a biometric unit is available to the second user device;
transmit, to the second user device based at least in part on receiving the selection message, an authentication message indicating that the second user device is to assist with authenticating the first user device with the service provider;
receive, from the second user device based at least in part on transmitting the authentication message, one or more encrypted authentication factors associated with authenticating the first user device with the service provider, and an indication of successful verification of biometric information; and
transmit, to the first user device, the one or more encrypted factors associated with authenticating the first user device with the service provider.

16. The non-transitory computer-readable medium of claim 15, wherein the processor is configured to determine the list of available user devices based at least in part on determining that biometric units are available to the user devices.

17. The non-transitory computer-readable medium of claim 15, wherein the processor is configured to determine one or more user devices to be included in the list of available user devices based at least in part on determining user devices that are associated with the first user device.

18. The non-transitory computer-readable medium of claim 15, wherein, to receive the one or more encrypted authentication factors, the processor is configured to receive a first encrypted authentication factor, and receiving a second encrypted authentication factor based at least in part on successful authentication of the first encrypted authentication factor by the service provider.

19. The non-transitory computer-readable medium of claim 15, wherein, to receive the one or more encrypted authentication factors, the processor is configured to receive the one or more encrypted authentication factors based at least in part on the successful verification of biometric information.

20. The non-transitory computer-readable medium of claim 15, wherein, to receive the one or more encrypted authentication factors, the processor is configured to receive an indication that the encrypted authentication factor is encrypted based at least in part on real-time verification of the biometric information.

\* \* \* \* \*